(12) United States Patent
Plithides et al.

(10) Patent No.: US 9,006,384 B2
(45) Date of Patent: Apr. 14, 2015

(54) FASTENERS MADE OF A POLYMER MATERIAL

(75) Inventors: Gregory C. Plithides, Los Gatos, CA (US); Suresh Sriram, Aurora, IL (US)

(73) Assignee: Solvay Specialty Polymers USA, LLC, Alpharetta, GA (US)

( * ) Notice: Subject to any disclaimer, the term of this patent is extended or adjusted under 35 U.S.C. 154(b) by 263 days.

(21) Appl. No.: 13/260,812

(22) PCT Filed: Mar. 26, 2010

(86) PCT No.: PCT/EP2010/054048
§ 371 (c)(1),
(2), (4) Date: Sep. 28, 2011

(87) PCT Pub. No.: WO2010/112435
PCT Pub. Date: Oct. 7, 2010

(65) Prior Publication Data
US 2012/0025020 A1  Feb. 2, 2012

Related U.S. Application Data

(60) Provisional application No. 61/164,599, filed on Mar. 30, 2009, provisional application No. 61/164,601, filed on Mar. 30, 2009.

(51) Int. Cl.
| | |
|---|---|
| C08G 16/00 | (2006.01) |
| C08G 16/06 | (2006.01) |
| C08G 61/10 | (2006.01) |
| F16B 33/00 | (2006.01) |
| C08L 65/02 | (2006.01) |
| C08F 283/00 | (2006.01) |
| C08F 283/08 | (2006.01) |
| F16B 37/00 | (2006.01) |

(Continued)

(52) U.S. Cl.
CPC ............. *C08G 61/10* (2013.01); *F16B 37/00* (2013.01); *F16B 5/0275* (2013.01); *F16B 33/006* (2013.01); *F16B 2021/14* (2013.01); *C08L 65/02* (2013.01)

(58) Field of Classification Search
CPC ....................................................... C08G 16/00
USPC ......... 528/396, 220, 127, 128; 264/45.9, 319; 525/534; 424/9.322
See application file for complete search history.

(56) References Cited

U.S. PATENT DOCUMENTS

| | | | |
|---|---|---|---|
| 5,366,414 A | 11/1994 | Rath | |
| 7,875,696 B2 * | 1/2011 | Myrick et al. | 528/127 |
| 8,119,764 B2 * | 2/2012 | Maljkovic et al. | 528/396 |

(Continued)

FOREIGN PATENT DOCUMENTS

| | | |
|---|---|---|
| EP | 2014251 A1 | 1/2009 |
| GB | 1365033 A | 8/1974 |

(Continued)

OTHER PUBLICATIONS 764684 claims.*

(Continued)

*Primary Examiner* — Duc Truong

(57) ABSTRACT

Fasteners, such as bolts, nuts and screws, rivets, pins, and retaining rings, made of a highly kinked rigid-rod polyarylene exhibiting outstanding characteristics, notably a high torque and a high tensile elongation, a measure of practical toughness.

14 Claims, 4 Drawing Sheets

(51) Int. Cl.
*F16B 5/02* (2006.01)
*F16B 21/14* (2006.01)

(56) References Cited

U.S. PATENT DOCUMENTS

| | | | |
|---|---|---|---|
| 8,592,531 B2 * | 11/2013 | Thomas et al. | 525/471 |
| 2008/0101887 A1 | 5/2008 | Toosky et al. | |
| 2008/0101888 A1 | 5/2008 | Toosky et al. | |
| 2009/0014011 A1 | 1/2009 | Edlauer et al. | |
| 2009/0028660 A1 | 1/2009 | Csik et al. | |

FOREIGN PATENT DOCUMENTS

| WO | WO2007/101857 | * | 9/2007 |
|---|---|---|---|
| WO | WO 2009012244 A2 | | 1/2009 |
| WO | WO 2009034086 A2 | | 3/2009 |
| WO | WO 2010112436 A1 | | 10/2010 |

OTHER PUBLICATIONS

Weast R.C—"Definitive Rules for Nomenclature of Organic Chemistry", CRC Handbook of Chemistry and Physics, 64th edition, 1983-84, pp. C1-C44, CRC Press Inc., Boca Raton, Florida; 26 pgs.

Randic M., "Aromaticity of Polycyclic Conjugated Hydrocarbons", Chemical Reviews, 2003, 103, No. 9, pp. 3449-3605, American Chemical Society; 157 pgs.

* cited by examiner

FASTENERS MADE OF A POLYMER MATERIAL

CROSS REFERENCE TO RELATED APPLICATIONS

The present application is a U.S. national stage application under 35 U.S.C. §371 of International Application No. PCT/EP2010/054048 filed Mar. 26, 2010, which claims the priority benefit to U.S. provisional application No. 61/164,599 filed on Mar. 30, 2009 and to U.S. provisional application No. 61/164,601 filed on Mar. 30, 2009, the whole content of these applications being herein incorporated by reference for all purposes.

FIELD OF THE INVENTION

The present invention relates to fasteners made of a particular polyarylene material.

BACKGROUND OF THE INVENTION

Fasteners of multiple designs, including nuts, screws, clips, rivets and many other varieties, have been made available depending on the particularly encompassed application. A common feature thereof lies in the particularly stringent requirements associated herewith.

Indeed, during their life, any fasteners, included unthreaded and threaded fasteners, are notably submitted to harsh mechanical conditions: they are stretched, twisted and bent. Fasteners are further generally submitted to various aggressive environmental, such as vibrations, thermal cycles and/or chemical attacks, which can alter their mechanical performances over time, and, in the worst scenarios, cause fasteners to be literally "lost".

A class of fasteners of particular importance is threaded fasteners that face with additional specific problems. When threaded fasteners are tightened, we pump energy into them, and, after we let go, this energy is held therein by friction constraints. Typically, these ones are concentrated to a large extent in the fastener threads, which yet often represent the most delicate portions of the fastener as the result of their fineness. Aggressive environmental factors as above recited can cause threaded fasteners to loose all their preload and literally be lost ("loosening" problem). Somewhat related to loosening is thread stripping, another failure which occurs when threaded fasteners are over-tightened; thread stripping is characterized by a deformation (alteration) of the fastener threads, typically resulting in a decrease of performance.

Certain fasteners, including certain unthreaded and threaded fasteners, can have complex designs, and shaping/machining them from an appropriate material can be a tough matter. In case of threaded fasteners, forming fine and regular threads has proved to be particularly uneasy.

Material selection is crucial for fasteners. Metal has remained for several tens of years the only suitable choice, because no plastic material was able to provide the required level of mechanical properties, in particular a high elongational strength, a high flexural strength and, last but not least, a high torsional strength (or torque). Indeed, for many fasteners, including but not limited to threaded fasteners, load bearing ability is typically a function of the shear or torsional strength of the material of construction.

Metal fasteners present however a certain number of disadvantages. Metal fasteners are heavy; in contrast, certain applications, in particular self-propellant vehicles, and more particularly aircrafts, ask for light-weight materials. Metal fasteners are in general prone to corrosion; in addition, when dissimilar metal are joined together, galvanic corrosion can occur. Metal fasteners are electrically conductive. Machining complex shapes from a metal, as well as forming fine and regular threads, is a tough matter.

The development of engineering composites, such as carbon fiber-reinforced polyetheretherketone (PEEK) has well offered some viable alternatives to not very demanding fasteners applications. Adding fiber reinforcement increases well tensile and flexural properties, but has little effect on the shear properties. In addition, fiber reinforcement reduces tensile elongation, a measure of practical toughness. In addition, when fasteners are produced using the injection molding process with fiber reinforced materials, property variations due to flow direction occurs. In addition, when the fasteners are threaded, it is unlikely that the threads contain much fiber reinforcement, because they are relatively thin and perpendicular to the usual flow direction.

An important progress was achieved when the use of rigid rod polyphenylenes was proposed for the first time for the manufacture of unthreaded fasteners. Then, EP 2 014 251 describes a pin for securing the position of a part of a body (for example, a head) for medical procedures, which is made of an optionally substituted polyparaphenylene (unkinked rigid rod polyphenylene of the $1^{st}$ generation), such as:

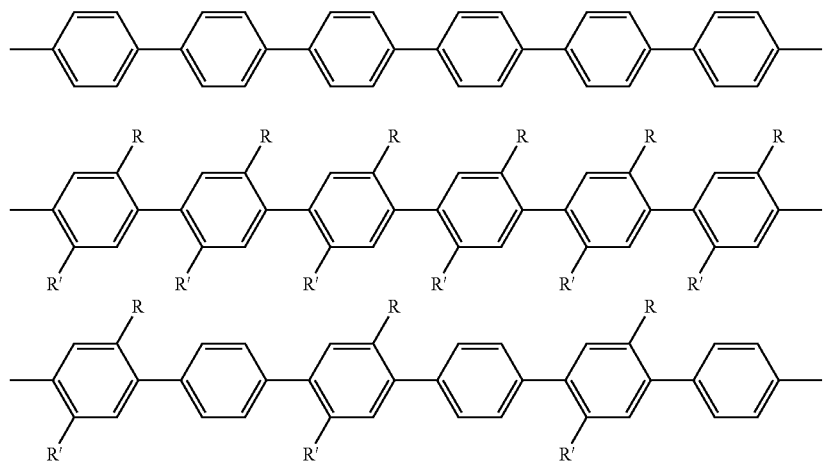

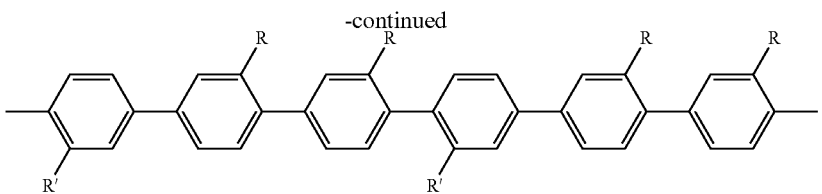

wherein R and R' are substituents such as —C(=O)C$_6$H$_5$.

TECAMAX® SRP polyphenylene, commercially available from Ensinger, is alleged to be such a material. As the result of their rigid molecular structure, the polyparaphenylenes of EP 2 014 251 allow indeed for much higher torque than conventional composite polymer materials (e.g. carbon fiber-reinforced PEEK). No reinforcing fibers are needed; homogeneous materials have distinct advantages with regard to the uniformity of mechanical properties. However, neither the proposed rigid-rod polyphenylenes of the 1$^{st}$ generation nor, as a matter of fact, the slightly kinked rigid-rod polyphenylenes of next generation (as notably proposed by SOLVAY ADVANCED POLYMERS, L.L.C. as PrimoSpire® PR-120) are fully satisfactory for making the pins of concern. Such polyphenylenes can be qualified as "not very satisfactory" for very demanding applications, as certain unthreaded fasteners are notably as the result of their design (shape, thickness, etc.), and as most of threaded fasteners are as the result of the mandatory presence of threads. For said very demanding fastener applications, there is still a need for a polymer material that would provide a higher tensile elongation (a measure of practical toughness). Another problem, which can even be more acute for certain designs than the previous one, results from the intrinsic rigid nature of the so-proposed polyarylenes of the 1$^{st}$ two generations: shaping them into articles having complex shapes or with a very low thickness by melt processing techniques such as injection molding or extrusion, remains difficult, as it was originally the case for metal.

There is thus an important need for fasteners exhibiting a confluence of characteristics including high torque, high practical toughness (high tensile elongation), high elongational strength, high stiffness, high chemical resistance, light weight, and which can be easily formed by melt-processing techniques, such as extrusion or injection-molding, including when the parts of concern have a complex shape and/or very thin portions (e.g. threads, or when an extruder with small orifices must be used).

THE INVENTION

This need, and still other ones, are met by a fastener (F) comprising a polymer material (M) comprising at least one kinked rigid-rod polyarylene (P) of which more than 50 wt. % of the recurring units are recurring units (R) of one or more formulae consisting of an optionally substituted arylene group, provided said optionally substituted arylene group is linked by each of its two ends to two other optionally substituted arylene groups via a direct C—C linkage, said recurring units (R) being a mix (M) consisting of:

between 0 and 75 mole %, based on the total number of moles of the recurring units (R), of rigid rod-forming arylene units (Ra), said rigid rod-forming arylene units (Ra) being optionally substituted by at least one monovalent substituting group, with between 25 and 100 mole %, based on the total number of moles of the recurring units (R), of kink-forming arylene units (Rb), said kink-forming arylene units (Rb) being optionally substituted by at least one monovalent substituting group.

BRIEF DESCRIPTION OF THE DRAWINGS

For a detailed description of the invention, reference will now be made to the accompanying drawings in which.

DETAILED DESCRIPTION OF THE INVENTION

The Fastener (F)

Figure 1:
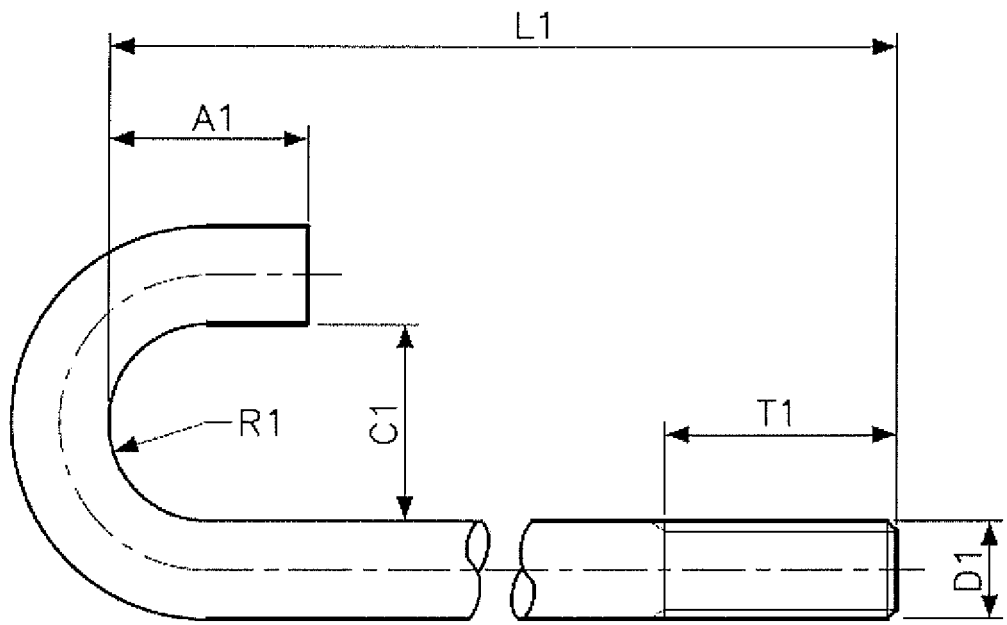
FIG. 1 represents an example of a hook bolt, round bent; A, L, R, C, T and D are the characteristic dimensions of said hook bolt.

All the terms as herein used to describe the fastener (F) are well familiar to the skilled person, and should be understood under their common meaning.

The fastener (F) is generally a mechanical device designed specifically to hold, join, couple, assemble or maintain equilibrium of single or multiple components. The resulting assembly may function dynamically or statically as a primary or secondary component of a mechanism or structure. Based on the application intended, the fastener (F) may receive varying degrees of built-in precision and engineering capability, ensuring adequate, sound service under planned, pre-established environmental conditions.

The weight of the polymer material (M), based on the total weight of the fastener (F), is usually above 10%, preferably above 50% and more preferably above 90%. Still more preferably, the fastener (F) consists essentially of the polymer material (M). The most preferably, the fastener (F) consists of the polymer material (M).

The fastener (F) may consist of one part, i.e. it is a single-component device. Then, the single part consists of the polymer material (M). Alternatively, the fastener (F) may consist of several parts. The case being, either one part or several parts of the fastener (F) may consist of the polymer material (M). When several parts of the fastener (F) consist of the polymer material (M), each of them may consist of the very same polymer material (M); alternatively, at least two of them may consist of different polymer materials (M) in accordance with the invention.

The fastener (F) can be a threaded fastener, i.e. a fastener that contains threads.

Threads are typically ridges (i.e. raised lines or strips) or grooves or ribs that are present on at least part of the surface of a threaded fastener. Threads can have different forms, including spiral, helical or parallel. Threads can notably be present around the circumference of certain screws, bolts and nuts.

Advantageously, at least part of the threads contained in the fastener (F) is composed of the polymer material (M). Preferably, essentially all the threads contained in the fastener (F) are composed of the polymer material (M). More preferably, all the threads contained in the fastener (F) are composed of the polymer material (M).

The threaded surface of a threaded fastener in accordance with the present invention, in particular when essentially all its threads are composed of the polymer material (M), can represent above 1%, above 2%, above 5%, above 10%, above 20%, above 30%, above 40%, above 50%, above 60%, above 70%, above 80%, above 90%, above 95%, above 99% or about 100% of the whole surface developed by said threaded fastener.

The fastener (F) can be externally threaded, i.e. it can have threads formed on at least part of the outside of a cylinder or other volume, such as on bolts and screws. The threaded surface of an externally threaded fastener in accordance with the present invention, in particular when essentially all its threads are composed of the polymer material (M), can represent above 1%, above 2%, above 5%, above 10%, above 20%, above 30%, above 40%, above 50%, above 60%, above 70%, above 80%, above 90%, above 95%, above 99% or about 100% of the external surface developed by said externally threaded fastener.

The fastener (F) can be internally threaded, i.e. it can have threads formed on at least part of the inside of a cylinder or other volume, such as on nuts. The threaded surface of an internally threaded fastener in accordance with the present invention, in particular when essentially all its threads are composed of the polymer material (M), can represent above 1%, above 2%, above 5%, above 10%, above 20%, above 30%, above 40%, above 50%, above 60%, above 70%, above 80%, above 90%, above 95%, above 99% or about 100% of the interior surface developed by said internally threaded fastener.

The fastener (F) can be both internally and externally threaded, i.e. it can have threads formed on at least part of the outside of a cylinder or other volume, and threads formed on at least part of the inside of said cylinder or other volume, such as certain internally and externally threaded bushings.

The present invention is especially (but not only) useful when the fastener (F) is a threaded fastener, with outstanding results being obtained when essentially all the threads of the threaded fastener are composed of the polymer material (M) and the threaded surface of the threaded fastener represents above 10%, preferably above 20%, and more preferably above 50% of its whole surface.

Common types of threaded fasteners in accordance with the present invention include bolts, nuts, screws, headless set screws, scrivets, threaded studs and threaded bushings.

The fastener (F) can be a bolt. A bolt is typically a headed, externally threaded fastener. A bolt is generally designed for insertion through holes in assembled parts to mate with a nut, and is normally intended to be tightened or released by turning that nut.

Certain bolts in accordance with the present invention are qualified as "bent bolts" in reference to their shape. Bent bolts may be notably in the shape of a "U", "J", "L", or eyebolts. "U" shaped bolts have typically threads at their both ends, while the other cited bent bolts have typically threads at only one end.

Other bolts in accordance with the present invention are:
square bolts, in reference to the shape of their head which is square;
hex bolts, in reference to the shape of their head which is hexagonal;
hex flange bolts, which are similar to hex bolts but contain a washer-like flat surface that mates with a substrate;
round head bolts, which have typically a rounded headed at one end; among them, it can be distinguished notably between round head short square neck bolts, round head ribbed neck bolts, round head fin neck bolts, step bolts, countersunk bolts and slotted countersunk bolts, flat countersunk head elevator bolts, T-head bolts, plow bolts and track bolts;
eyebolts, which have typically a looped head designed to receive a hook or rope, as in the exemplified hook bolt of FIG. 1.

The fastener (F) can be a nut. A nut is typically a perforated block possessing an internal, or female, screw thread, intended for use on an external, or male, thread such as a bolt for the purpose of tightening or holding two or more bodies in definite relating positions.

Certain nuts in accordance with the present invention are flange nuts. Flange nuts have typically a wide flange at one end that acts as an integrated, non-spinning washer; this serves usually to distribute the pressure of the nut over the part being secured, reducing the chance of damage to the part and making it less likely to loosen as a result of an uneven fastening surface. The flange is commonly serrated to provide a locking action.

Certain other nuts in accordance with the present invention are coupling nuts. Coupling nuts are typically long nuts tapped from each side to meet in the middle, rather than all the way through in the same direction, which can be used to connect two threaded rods end to end.

Still certain other nuts in accordance with the present invention are wing nuts, also called thumbnuts. These ones are typically nuts with wing like projections for thumb and forefinger leverage in turning.

The fastener (F) can be a screw. A screw is typically a headed and externally threaded fastener. It has usually capabilities which permit it to be inserted into holes in assembled parts, of mating with a preformed internal thread or forming its own thread, and of being tightened or released by torquing its head.

Certain screws in accordance with the present invention are socket screws. Socket screws are typically screw caps with a hex, spline, or special hole in the top that requires a matching "screwdriver tip".

Certain other screws in accordance with the present invention are tapping screws. Tapping screws are able to "tap" their own mating internal thread when driven into preformed holes in various materials. Tapping screws are typically high strength, one-piece, one-side-installation threaded fasteners. Because they can form or cut their own mating thread, there is unusually good thread fit which enhances resistance to their loosening in service. Tapping screws in accordance with the present invention can be disassembled and are generally reusable.

Still other screws in accordance with the present invention are machine screws. Machine screws have typically a thread along the entire length of their shaft; they can also be viewed as screws with a tapered top that fits into a countersunk hole and when screwed in is flush with the surface being screwed into.

Still other screws in accordance with the present invention are thumb or wing screws, i.e. screws which are typically designed so that they can be turned with the thumb and fingers.

Still other screws in accordance with the present invention are qualified as "wood screws", in that they have typically a pointed shank, a slotted or recessed head, and a sharp tapered thread of relatively coarse pitch suitable for use essentially, if not only, in wood.

Still other screws in accordance with the present invention are qualified as miniature screws by reference to their tiny size. Among said miniature screws, it can be notably cited fillister heads, pan head, flat heads and binding heads.

Screw-washer assemblies (SEMS) wherein at least the screw comprises the polymer material (M) form also part of the present invention.

The fastener (F) can be a headless set screw. In contrast with the screw in accordance with the present invention as above defined which is typically headed, the present headless set screw has no projecting head. In general, its top is either slotted or provided with a socket.

The fastener (F) can be a threaded stud. A threaded stud is typically a fastening device with one pointed end driven into a material, such as concrete, and the other end is threaded and extends above the surface for the attachment of structural members.

Figure 2:
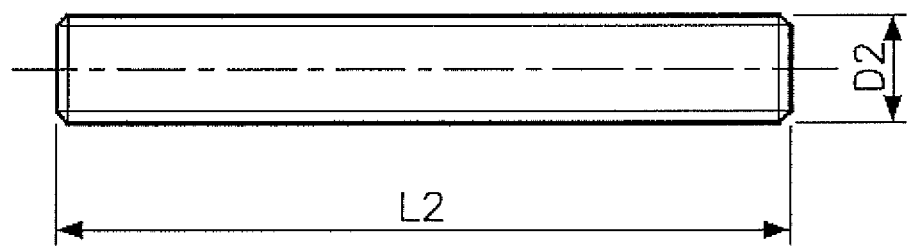
FIG. 2 represents an example of a continuous thread stud in accordance with the present invention.

Certain threaded studs in accordance with the present invention are continuous thread studs, i.e. they are threaded from end to end, and are often used for flange bolting with two nuts applied. FIG. 2 shows an example of a general purpose continuous thread stud in accordance with the present invention.

Points of continuous thread studs in accordance with the present invention are generally flat and chamfered. Continuous thread studs in accordance with the present invention can notably be used for piping applications; then, as required for these applications, these ones have a length measurement requirement different from all other studs, i.e., their length is measured from first thread to first thread, exclusive points.

Figure 3:
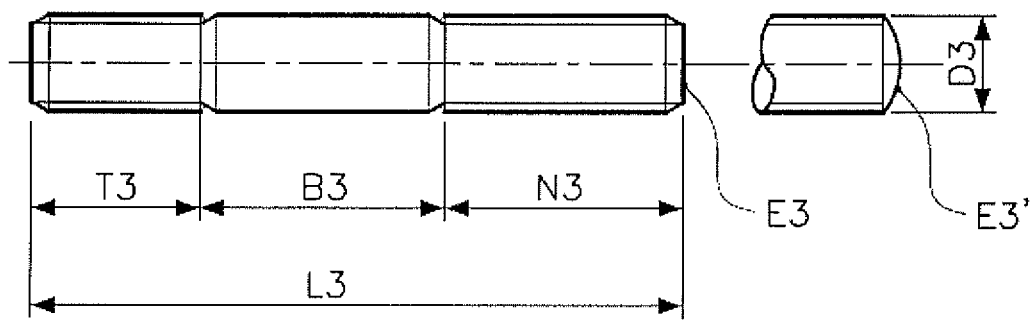
FIG. 3 represents an example of a tap-end stud in accordance with the present invention.

Certain other threaded studs in accordance with the present invention are tap-end studs. Typical tap-end studs have a short thread on one end, called the tap end which is threaded to a certain Class fit (this end is suitable for screwing into a tapped hole), while the other or nut end is threaded with another Class fit. The tap end has a chamfered point, but the nut end may have either a chamfered or round point. FIG. 3 shows an example of a tap-end stud in accordance with the present invention.

Figure 4:
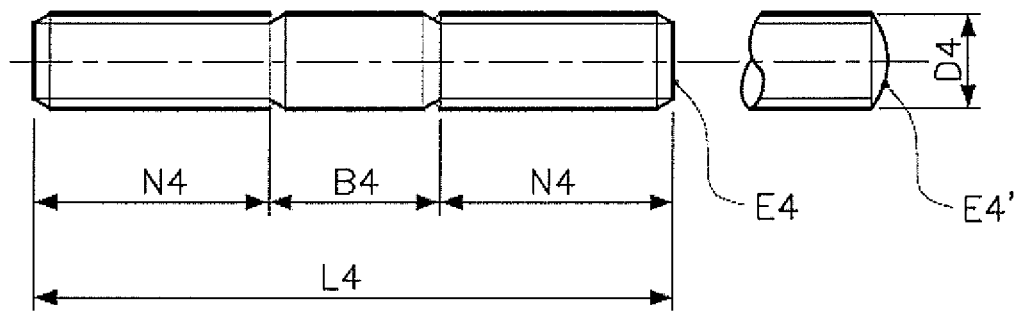
FIG. 4 represents an example of a tap-end stud in accordance with the present invention.

Still other threaded studs in accordance with the present invention are double-end studs. Double-end studs have typically substantially equal-length or equal-length threads on each end to accommodate a nut and are threaded to a certain Class fit. Both ends may have independently from each other chamfered points or round points. Double-end studs are useful for flange bolting or other applications where torching from both ends is necessary or desirable. FIG. 4 shows an example of a double-end stud in accordance with the present invention.

The fastener (F) can be a scrivet. Scrivets are typically threaded fasteners that comprise an at least partially threaded shank and a head; the shrank can be threaded on its whole surface. Certain scrivets in accordance with the present invention consist of said threaded shank and said head. Scrivets are generally inserted through holes. Scrivets are useful for assembling two or more components by an applied force which deforms the plain scrivet end to develop a completed mechanical joint.

Figure 5:
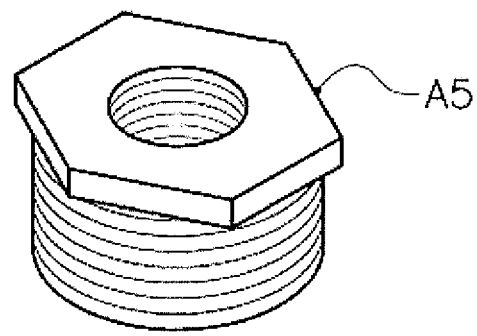
FIG. 5 represents an example of an internally and externally threaded bushing in accordance with the present invention.

The fastener (F) can be a threaded bushing. The bushings in accordance are internally and/or externally threaded, so that they provide fasting functionality in addition to connecting functionality. Preferably, they are internally and externally threaded. An example of an internally and externally threaded bushing in accordance with the present invention is the hex bushing of FIG. 5.

In a special embodiment of the present invention, the fastener (F) is a prevailing-torque fastener, such as a prevailing-torque screw or a prevailing-torque nut. A prevailing-torque fastener can be defined as a threaded fastener which is frictionally resistant to rotation due to a self-contained prevailing-torque feature; in particular, a prevailing-torque screw can be viewed as an externally threaded fastener which is frictionally resistant to rotation due to a self-contained prevailing-torque feature, and not because of a compressive load developed against the underhead bearing surface of the screw or a tensile load developed in the shank of the screw. Certain prevailing-torque fasteners in accordance with the present invention are fasteners made of the polymer material (M), to which have been added an insert of a fused substance other than the polymer material (M), such a lubricant, in their threaded length. Depending on the amount of friction present because of the surface finish and lubricants, the dimensional characteristics of the insert may vary to achieve the performance requirements.

The fastener (F) can be an unthreaded fastener, i.e. it does not contain threads.

Common types of unthreaded fasteners in accordance with the present invention include pins, retaining rings, rivets and fastening washers.

The fastener (F) can be a pin. Pins are typically thin, often straight, cylindrical unthreaded fasteners; they are suitable for securing the position of two or more machine parts.

Figure 6:
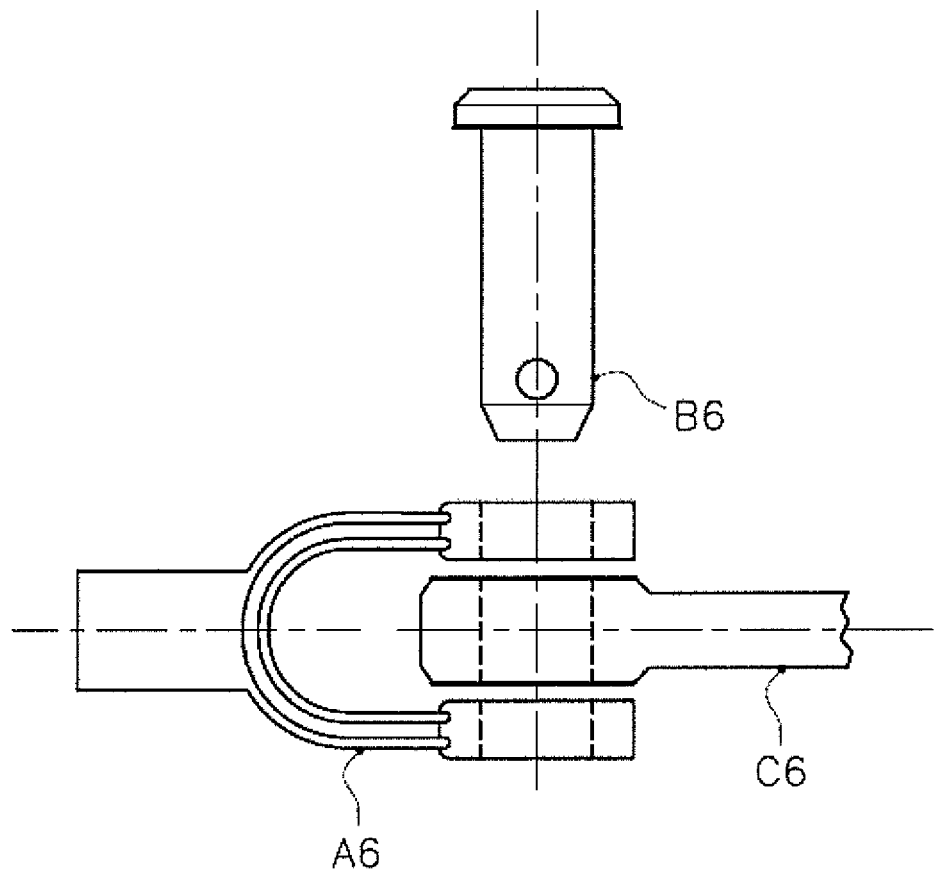
FIG. 6 represents an example of a clevis pin according to the present invention which joins a yoke to a rod end.

Certain pins in accordance with the present invention are clevis pins. Clevis pins are typically fasteners with a head at one end and a hole at the other used to join a clevis to a rod. A clevis is typically a yoke with a hole formed or attached at one end of a rod; FIG. 6 shows an example of a clevis pin according to the present invention which joins a yoke to a rod end. When an eye or hole of a second rod is aligned with the hole in the yoke, a clevis pin can be inserted to join the two. A cotter pin can then be inserted in the hole of the clevis pin to hold it in, yet the fastening is readily detachable. This joint is used for rods in tension where some flexibility is required.

Figure 7:
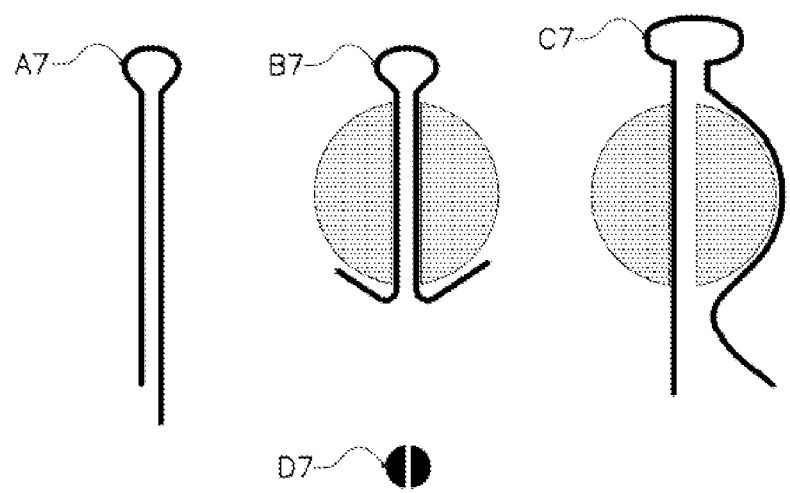
FIG. 7 represents in A: a new cotter pin, B: an installed cotter pin, C: a spring pin, D: a cross-section of a cotter pin (traditional design).

Certain other pins in accordance with the present invention are cotter pins (US terminology). Cotter pins are typically unthreaded fasteners with two tines which can be inserted through a slot for the purpose of holding two pieces together. Cotter pins have traditionally a half-circular cross section. In the United Kingdom, the terms "split pins" are traditionally used to describe the same device. A new cotter pin (see FIG. 7A) has its flat inner surfaces touching for most of its length so that it typically appears to be a split cylinder (FIG. 7D). Once inserted, the two ends of the pin are bent apart, locking it in place (FIG. 7B). In order to facilitate the initial separation of the tines, one tine of the cotter pin is often noticeably longer than the other; and in order to ease insertion into a hole, the longer tine is often slightly curved or beveled to overlap the tip of the shorter tine.

Still other pins in accordance with the present invention are spring pins. Spring pins, as shown in FIG. 7C, also called hitch pins, sometimes known as R-pins from their shape, are also available, which are not designed to be permanently bent. In this design, only one section of the pin passes through the shaft to be secured, the other section being curved to wrap around the outside of the shaft (FIG. 7C).

Figure 8:
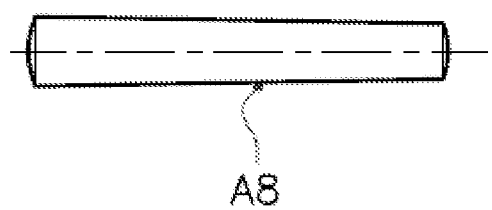
FIG. 8 represents an example of a taper pin in accordance with the present invention.

Still other pins in accordance with the present invention are taper pins. Taper pins are headless, solid pins having controlled diameter, length, and taper, generally with crowned ends. These self-holding pins are useful for connecting parts together. Standard taper pins have a diametral tape of from ¼ in. to 12 in. (0.6 cm to 30 cm) and are driven in holes drilled and reamed to fit. They are sometimes used to connect a hub or collar to a shaft. Taper pins are frequently used to maintain the location of one surface with respect to another. An example of a taper pin design is shown in FIG. 8.

Still other pins in accordance with the present invention are dowel pins. Dowel pins often have typically a sharpened or deformed end. They can be inserted into two adjacent pieces and hold them together. They are useful notably for fastening mortise-and-tenon joints. Dowel pins can be obtained from cutting dowel rods, i.e. solid, cylindrical rods, into short lengths.

Still other pins in accordance with the present invention are straight pins. Straight pins have typically ungrounded, straight cylindrical sides with both ends chamfered.

Still other pins in accordance with the present invention are grooved pins. Grooved pins are pins with grooves; grooved pins often have three grooves equally spaced on the diameter of the pins.

The fastener (F) can be a retaining ring. Retaining rings are typically flat, circular, unthreaded fasteners with a hollow center and an open section.

Retaining rings provide typically a shoulder and can be inserted onto a shaft or inside a hole with an internal groove.

The fastener (F) can be a rivet. Rivets are typically non-threaded fasteners that comprise a shank and a head; certain rivets in accordance with the present invention consist of said shank and said head. Rivets are generally inserted through holes. The rivet shank can be formed into a matching head located on the other side of the rivet. Rivets are useful for assembling two or more components by an applied force which deforms the plain rivet end to develop a completed mechanical joint.

The fastener (F) can be a fastening washer, such as a lock washer. Lock washers are typically washers placed underneath a nut or screw for the purpose of preventing loosening by exerting pressure. Lock washers in accordance with the present invention have advantageously a helical structure, which helps in exerting the pressure. Spring washers are similar to lock washers.

The Kinked Rigid-Rod Polyarylene (P)

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples of arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms) were named in accordance with the recommendations of the CRC Handbook of Chemistry and Physics, 64$^{th}$ edition, pages $C_1$-$C_{44}$, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

A polyarylene is intended to denote a polymer of which more than 50 wt. % of the recurring units are recurring units (R) of one or more formulae consisting of an optionally substituted arylene group, provided said optionally substituted arylene group is linked by each of its two ends to two other optionally substituted arylene groups via a direct C—C linkage. That the optionally substituted arylene group is linked by each of its two ends to two other optionally substituted arylene groups via a direct C—C linkage, is an essential feature of the recurring units (R); thus, an arylene recurring unit which is linked by at least one of its two ends to a group other than an arylene group such as phenylene recurring units ($\phi_1$, $\phi_2$ and $\phi_{2'}$ below:

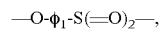

—O-$\phi_1$-S(=O)$_2$—,

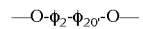

—O-$\phi_2$-$\phi_{2'}$-O— are not recurring units (R) in the sense of the present invention.

The arylene groups of which the recurring units (R) consist can be unsubstituted. Alternatively, they can be substituted by at least one monovalent substituting group.

The monovalent substituting group is usually not polymeric in nature; its molecular weight is preferably below 500, more preferably below 300, still more preferably below 200 and most preferably below 150.

The monovalent substituting group is advantageously a solubilizing group. A solubilizing group is one increasing the solubility of the polyarylene in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene by a solution polymerization process.

The monovalent substituting group is also advantageously a group which increases the fusibility of the polyarylene, i.e. it lowers its glass transition temperature and its melt viscosity, so as to desirably make the polyarylene suitable for thermoprocessing.

Preferably, the monovalent substituting group is chosen from:
- hydrocarbyls such as alkyls, aryls, alkylaryls and aralkyls;
- halogenos such as —Cl, —Br, —F and —I;
- hydrocarbyl groups partially or completely substituted by at least one halogen atom such as halogenoalkyls, halogenoaryls, halogenoalkylaryls and halogenoaralkyls;
- hydroxyl;
- hydrocarbyl groups substituted by at least one hydroxyl group, such as hydroxyalkyls, hydroxyaryls, hydroxyalkylaryls and hydroxyaralkyls;
- hydrocarbyloxys [—O—R, where R is a hydrocarbyl group], such as alkoxys, aryloxys, alkylaryloxys and aralkyloxys;
- amino (—NH$_2$);
- hydrocarbyl groups substituted by at least one amino group, such as aminoalkyls and aminoaryls;
- hydrocarbylamines [—NHR or —NR$_2$, where R is a hydrocarbyl group] such as alkylamines and arylamines;
- carboxylic acids and their metal or ammonium salts, carboxylic acid halides, carboxylic anhydrides;
- hydrocarbyl groups substituted by at least one of carboxylic acids, metals or ammonium salts thereof, carboxylic acid halides and carboxylic anhydrides, such as —R—C(=O)OH where R is an alkyl or an aryl group;
- hydrocarbylesters [—C(=O)OR or —O—C(=O)R, where R is a hydrocarbyl group] such as alkylesters, arylesters, alkylarylesters and aralkylesters;
- amido [—C(=O)NH$_2$];
- hydrocarbyl groups substituted by at least one amido group;
- hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
- sulfinic acid (—SO$_2$H), sulfonic acid (—SO$_3$H), their metal or ammonium salts,
- hydrocarbylsulfones [—S(=O)$_2$—R, where R is the hydrocarbyl group], such as alkylsulfones, arylsulfones, alkylarylsulfones, aralkylsulfones;
- aldehyde [—C(=O)H] and haloformyls [—C(=O)X, wherein X is a halogen atom];
- hydrocarbylketones [—C(=O)—R, where R is a hydrocarbyl group], such as alkylketones, arylketones, alkylarylketones and aralkylketones;
- hydrocarbyloxyhydrocarbylketones [—C(=O)—R$^1$—O—R$^2$, where R$^1$ is a divalent hydrocarbon group such as an alkylene, an arylene, an alkylarylene or an aralkylene, preferably a C$_1$-C$_{18}$alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;
- any of the above groups comprising at least one hydrocarbyl group or a divalent hydrocarbon group R$^1$, wherein said hydrocarbyl group or said R$^1$ is itself substituted by at least one of the above listed monovalent substituting groups, e.g. an arylketone —C(=O)—R, where R is an aryl group substituted by one hydroxyl group;

where:
- the hydrocarbyl groups contain preferably from 1 and 30 carbon atoms, more preferably from 1 to 12 carbon atoms and still more preferably from 1 to 6 carbon atoms;
- the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;
- the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;
- the aryl groups contain preferably from 6 to 30 carbon atoms; more preferably, they are phenyl groups;
- the alkyl group which is contained in the alkylaryl groups meets the preferences of the alkyl groups as above expressed;
- the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [—C(=O)-phenyl].

The core of the optionally substituted arylene group of the recurring units (R) is composed of preferably at most 3, more preferably at most 2, and still more preferably at most one benzenic ring. Then, when the core of the optionally substituted arylene group of the recurring units (R) is composed of one benzenic ring, the recurring units (R) are of one or more formulae consisting of an optionally substituted phenylene group, provided said optionally substituted phenylene group is linked by each of its two ends to two other optionally substituted arylene groups via a direct C—C linkage.

As above explained, the optionally substituted arylene group of the recurring units (R) is linked by each of its two ends to two other optionally substituted arylene groups via a direct C—C linkage. Preferably, it is linked by each of its two ends to two other optionally substituted phenylene groups via a direct C—C linkage.

As also above explained, both ends of the optionally substituted arylene group of the recurring units (R) can be characterized notably by a direction and by a sense.

A first set of recurring units (R) is composed of optionally substituted arylene groups, the ends of which
- have the same direction,
- are of opposite sense, and
- are in the straight foregoing of each other

[hereafter, rigid rod-forming arylene units (Ra)].

Non limitative examples of such optionally substituted arylene groups include:
| | |
|---|---|
| 1,4-phenylene (also named p-phenylene) | 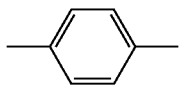 |
| 1,4-naphtylene | 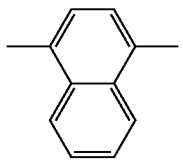 |
| 1,4-phenanthrylene and 2,7-phenanthrylene | 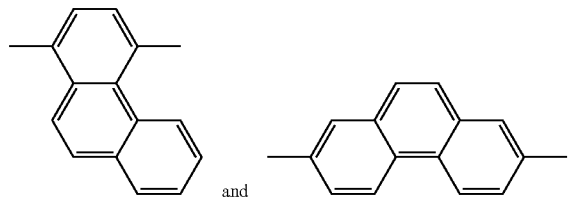 |
| 1,4-anthrylene and 9,10-anthrylene | 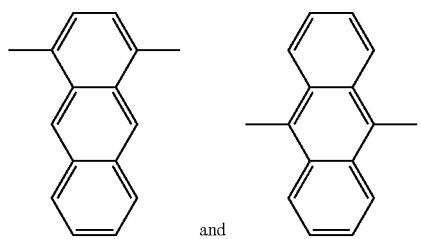 |
| 2,7-pyrenylene | 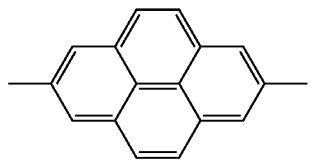 |
| 1,4-naphthacenylene and 5,12-naphthacenylene | 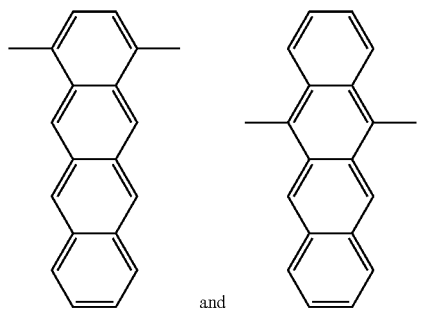 |
| 1,4-chrysenylene | 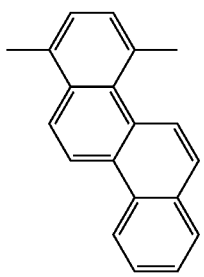 [SMILES: Cc1ccc(C)c2c1ccc1c3ccccc3ccc12] |

| | |
|---|---|
| 1,4-triphenylylene and 2,7-triphenylylene | 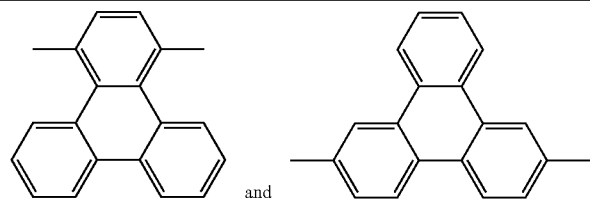 |
| 1,4-pentacenylene, 5,14-pentacenylene and 6,13-pentacenylene | 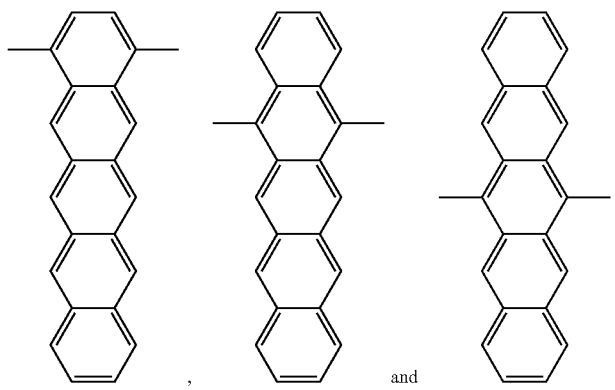 |
| 1,6-coronenylene | 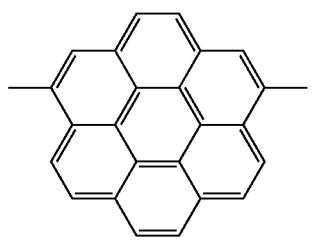 |
| 1,4-trinaphthylenylene, 2,9-trinaphthylenylene and 5,18-trinaphthylenylene | 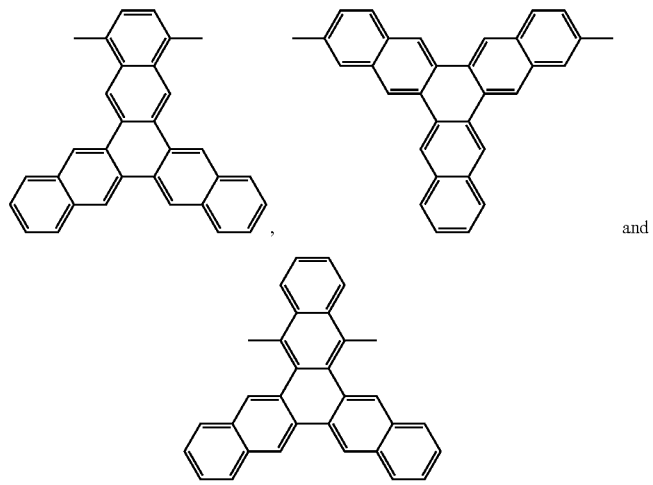 | and any of these groups substituted by at least one monovalent substituting group, as above defined, in particular by a phenylketone group.

Optionally substituted p-phenylenes are preferred as rigid rod-forming arylene units (Ra).

Rigid rod-forming arylene units (Ra), when contained in the polyarylenes, result in straight polymer chains exhibiting an outstanding rigidity. For this reason, such polyarylenes are commonly referred to as "rigid-rod polymers".

A second set of recurring units (R) is composed of optionally substituted arylene groups, the ends of which either have a different direction, forming thus together an angle between 0 and 180°, said angle being possibly acute or obtuse,
or have the same direction and the same sense,
or have the same direction, are of opposite sense and are disjoint (i.e. not in the straight foregoing of each other)
[globally hereafter referred to as kink-forming arylene units (Rb)].

Then, a first subset of kink-forming arylene units (Rb) is composed of optionally substituted arylene groups, the ends of which have a different direction, forming together an acute angle [kink-forming arylene units (Rb-1)]. Non limitative examples of optionally substituted arylene groups the ends of which have a direction different from each other include:

| | |
|---|---|
| 1,2-phenylene (or o-phenylene) | 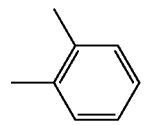 |
| 1,2-, 2,3- and 1,7-naphtylenes | 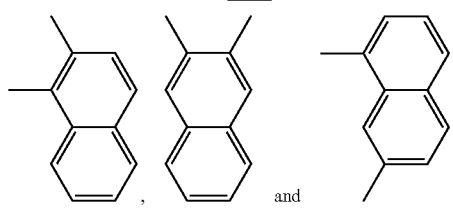 and |
| 1,2-, 1,8-, 1,9-, 2,3-, 2,5- and 2,10-phenanthrylenes | 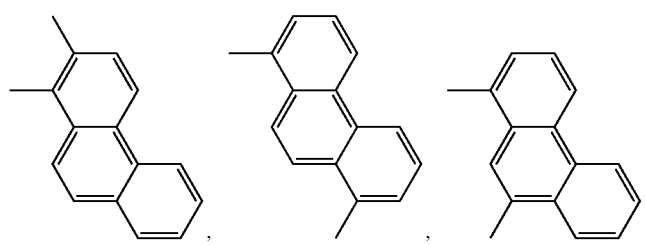 |
| 1,2- and 1,7-anthrylenes | 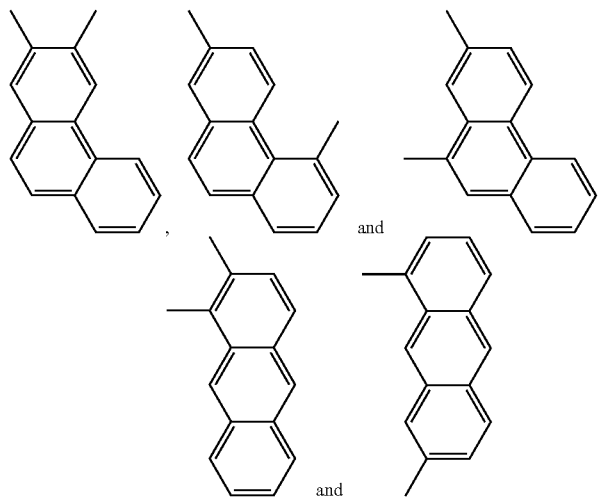 and | and any of these groups substituted by at least one monovalent substituting group, as above defined, in particular by a phenylketone group.

A second subset of kink-forming arylene units (Rb) is composed of optionally substituted arylene groups, the ends of which have a different direction, forming together an obtuse angle [kink-forming units (Rb-2)]. Non limitative examples of optionally substituted arylene groups the ends of which have a direction different from each other include:

| | |
|---|---|
| 1,3-phenylene (or m-phenylene) | 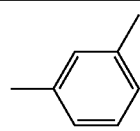 |
| 1,3- and 1,6-naphtylenes | 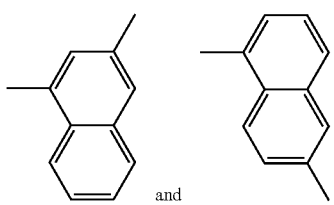 and |

1,3-, 1,5-, 1,7-, 2,4-, 2,9- and 3,10-phenanthrylenes

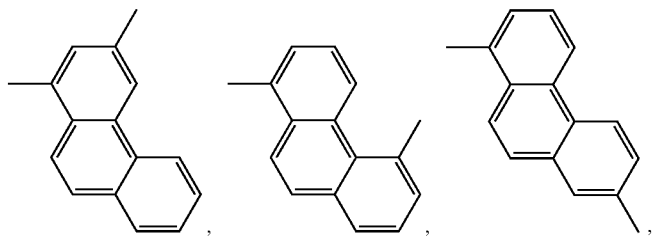

1,3- and 1,6-anthrylenes

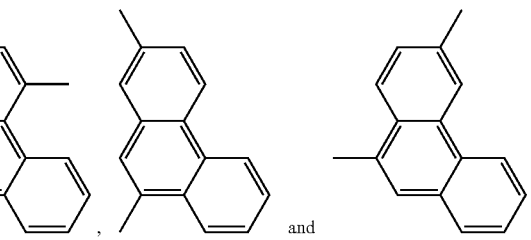

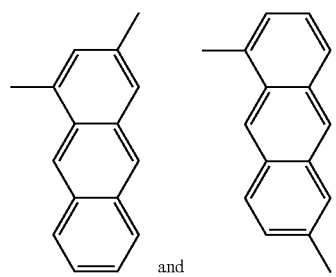

and any of these groups substituted by at least one monovalent substituting group, as above defined, in particular by a phenylketone group.

A third subset of kink-forming arylene units (Rb) is composed of optionally substituted arylene groups, the ends of which have the same direction and the same sense [kink-forming arylene units (Rb-3)]. Non limitative examples of optionally substituted arylene groups the ends of which the same direction and the same sense include:

1,8-naphthylene

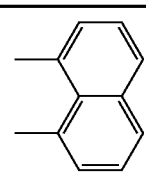

1,10- and 3,5-phenanthrylenes

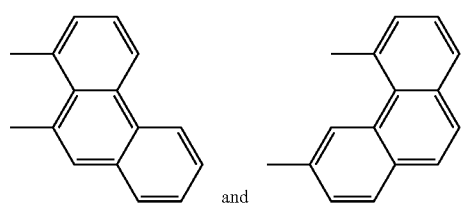

1,8- and 1,9-anthrylenes

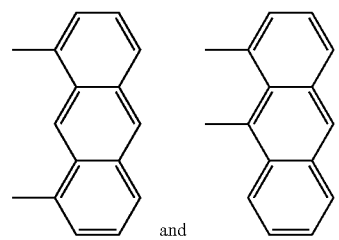

and any of these groups substituted by at least one monovalent substituting group, as above defined, in particular by a phenylketone group.

A fourth subset of kink-forming arylene units (Rb) is composed of optionally substituted arylene groups, the ends of which have the same direction, are of opposite sense and are disjoint [kink-forming arylene units (Rb-4)]. Non limitative examples of such optionally substituted arylene groups include:

1,5- and 2,6-naphtylenes

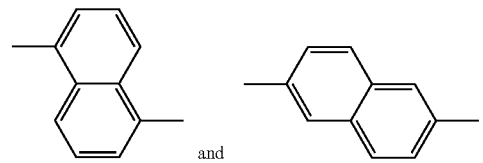

1,6-, 3,9- and 4,10-phenanthrylenes

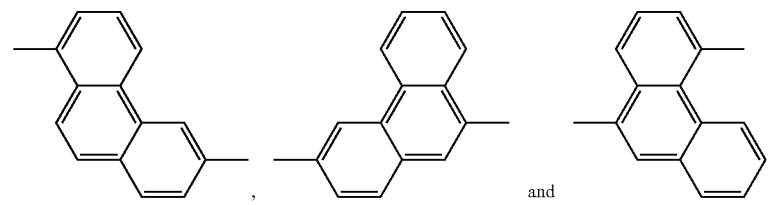

1,5-, 1,10- and 2,6-anthrylenes

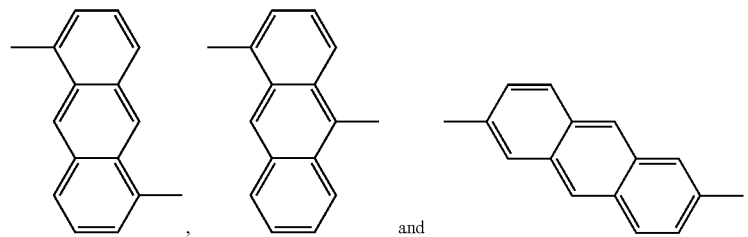

and any of these groups substituted by at least one monovalent substituting group, as above defined, in particular by a phenylketone group. Preferably, kink-forming arylene units (Rb) are chosen from kink-forming arylene units (Rb-1), kink-forming arylene units (Rb-2) and kink-forming arylene units (Rb-4). More preferably, kink-forming arylene units (Rb) are chosen from kink-forming arylene units (Rb-1) and kink-forming arylene units (Rb-2). Still more preferably, kink-forming arylene units (Rb) are chosen from kink-forming arylene units (Rb-1). Even still more preferably, kink-forming arylene units (Rb) are optionally substituted m-phenylenes.

Kink-forming arylene units (Rb), when contained in the polyarylene, result in more or less kinked polymer chains, exhibiting a higher solubility and fusibility than straight polymer chains. For this reason, such polyarylenes are commonly referred to as "kinked polymers".

The recurring units (R) of the kinked rigid-rod polyarylene (P) must be of a specific type, namely they must be a mix (M) consisting of:
  between 0 and 75 mole %, based on the total number of moles of recurring units (R), of rigid rod-forming arylene units (Ra), said rigid rod-forming arylene units (Ra) being optionally substituted by at least one monovalent substituting group
with
  between 25 and 100 mole %, based on the total number of moles of recurring units (R), of kink-forming arylene units (Rb), said kink-forming arylene units being optionally substituted or not by at least one monovalent substituting group, The recurring units (R) are preferably a mix (M) consisting of:
  between 0 and 75 mole %, based on the total number of moles of recurring units (R), of rigid rod-forming arylene units (Ra) chosen from optionally substituted p-phenylenes,
with
  between 25 and 100 mole %, based on the total number of moles of recurring units (R), of kink-forming arylene units (Rb) chosen from (i) optionally substituted m-phenylenes and (ii) mixes of optionally substituted m-phenylenes with optionally substituted o-phenylenes.

Preferably, essentially all, if not all, the rigid rod-forming arylene units (Ra) of the mix (M) are p-phenylene units substituted by at least one substituting group. More preferably, essentially all, if not all, the rigid rod-forming arylene units (Ra) of the mix (M) are p-phenylenes substituted by at least one monovalent substituting group chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the rigid rod-forming arylene units (Ra) of the mix (M) are p-phenylenes substituted by at least one monovalent substituting group chosen from arylketones and aryloxyarylketones, said arylketones and aryloxyarylketones being unsubstituted or substituted by at least one monovalent substituting group as those above listed. Most preferably, essentially all, if not all, the rigid rod-forming arylene units (Ra) of the mix (M) are p-phenylenes substituted by an arylketone group, in particular by the phenylketone group.

Essentially all, if not all, the kink-forming arylene units (Rb) of the mix (M) are m-phenylene units optionally substituted by at least one substituting group. More preferably, essentially all, if not all, the kink-forming arylene units (Rb) of the mix (M) are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the kink-forming arylene units (Rb) of the mix (M) are unsubstituted m-phenylene units.

In the mix (M), the number of moles of the kink-forming arylene units (Rb), based on the total number of moles of the recurring units (R), is preferably of at least 25%, more preferably at least 30%, still more preferably at least 35%, still more preferably at least 40%, and most preferably at least 45%. On the other hand, in the mix (M), the number of moles of the kink-forming arylene units (Rb), based on the total number of moles of the recurring units (R), is preferably of at most 90%, more preferably at most 75%, still more preferably at most 65% and most preferably at most 55%.

Good results were obtained when the recurring units (R) were a mix consisting of p-phenylene units substituted by a phenylketone group with unsubstituted m-phenylene units, in a mole ratio of about 50:50.

The kinked rigid-rod polyarylene (P) may further comprise recurring units (R*), different from recurring units (R).

Recurring units (R*) may contain or not at least one strong divalent electron withdrawing group linked on each of its ends to an arylene group. Non limitative examples of recurring units (R*) free of such strong divalent electron withdrawing group are:

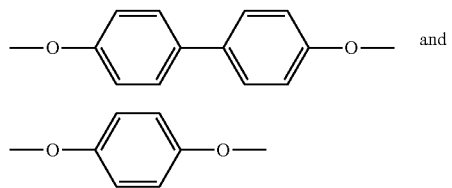

(1)

and (2)

Recurring units (R*) contain preferably at least one strong divalent electron withdrawing group linked on each of its ends to an arylene group, in particular a p-phenylene group. The divalent electron withdrawing group is preferably chosen from the sulfone group [—S(=O)$_2$—], the carbonyl group [—C(=O)—], the vinylene group [—CH=CH—], the sulfoxide group [—S(=O)—], the azo group [—N=N—], saturated fluorocarbon groups like —C(CF$_3$)$_2$—, organic phosphine oxide groups [—P(=O)(=R$_h$)—, where R$_h$ is a hydrocarbyl group] and the ethylidene group [—C(=CA$_2$)—, where A can be hydrogen or halogen]. More preferably, the divalent electron withdrawing group is chosen from the sulfone group and the carbonyl group. Still more preferably, recurring units (R*) are chosen from:
(i) recurring units of formula

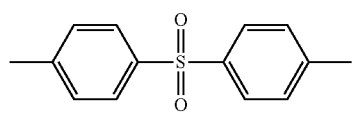

(3)

(ii) recurring units of formula

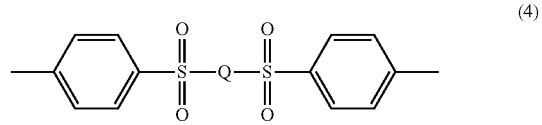

(4)

wherein Q is a group chosen from:

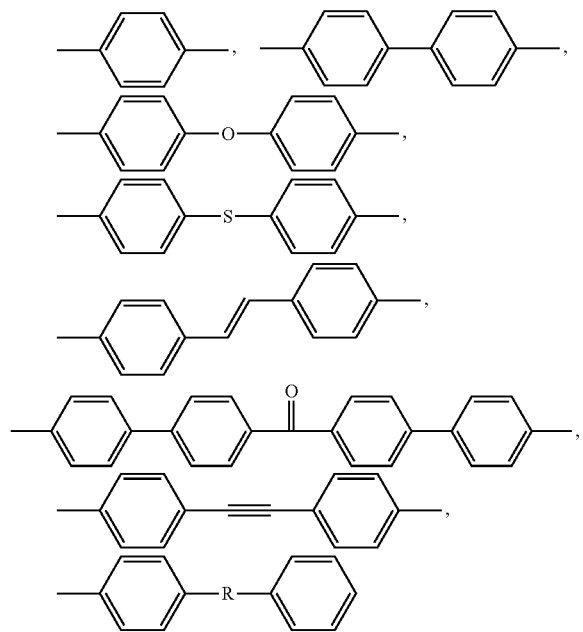

with R being:

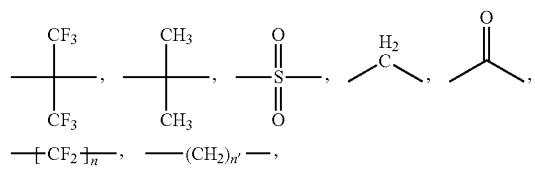

with n being an integer from 1 to 6 and n' being an integer from 2 to 6, Q being preferably chosen from

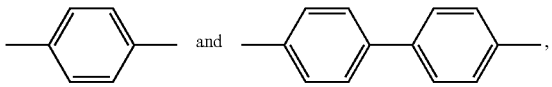

(iii) recurring units of formula

(5)

(iv) recurring units of formula

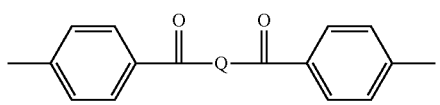
(6)

Preferably more than 75 wt. % and more preferably more than 90 wt. % of the recurring units of the polyarylene are recurring units (R). Still more preferably, essentially all, if not all, the recurring units of the polyarylene are recurring units (R).

Excellent results were obtained when the polyarylene was a kinked rigid-rod polyphenylene, essentially all, if not all, the recurring units of which consisted of a mix of p-phenylene substituted by a phenylketone group with unsubstituted m-phenylene in a mole ratio p-phenylene:m-phenylene of from 10:90 to 70:30, preferably of from 25:75 to 65:35, more preferably of from 35:65 to 60:40, still more preferably of from 45:55 to 55:45, and most preferably of about 50:50. Such a kinked rigid-rod polyphenylene is commercially available from Solvay Advanced Polymers, L.L.C. as Primo-Spire® PR-250 polyphenylene.

The kinked rigid-rod polyarylene (P) has usually a number average molecular weight greater than 1000, preferably greater than 5000, more preferably greater than about 10000 and still more preferably greater than 15000. On the other hand, the number average molecular weight of the kinked rigid-rod polyarylene is usually below 100000, and preferably below 70000. In a certain embodiment, the number average molecular weight of the kinked rigid-rod polyarylene is above 35000. In another embodiment, it is of at most 35000; in this embodiment, it is often of at most 25000 and sometimes of at most 20000. The number average molecular weight of a polyarylene in general, and in particular that of the kinked rigid-rod polyarylene (P), is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art who is a specialist of polyarylenes knows that their "relative" number average molecular weight, as measured by GPC, are generally off by a factor of about 2 times; it has already been accounted for this correction factor in all the above cited lower and upper limits of molecular weight.

It can be amorphous (i.e. it has no melting point) or semi-crystalline (i.e. it has a melting point). It is preferably amorphous.

It has a glass transition temperature of advantageously above 50° C., preferably above 120° C. and more preferably above 150° C.

The kinked rigid-rod polyarylene (P) is generally unbranched. In particular, it is generally essentially free, or even free, of recurring branching units -Ary-

[ ]$_x$ wherein Ary is a polyvalent arylene and x represents the number of bonds beyond two, x≥1.

The kinked rigid-rod polyarylene (P) can be prepared by any method. A method well known in the art to prepare such kinked rigid-rod polyarylene comprises polymerizing, preferably by reductive coupling, (i) at least one dihaloarylene molecular compound consisting of an optionally substituted rigid rod-forming arylene group, which is linked on each of its two ends to one halogen atom, such as chlorine, bromine and iodine, with (ii) at least one dihaloarylene molecular compounds consisting of an optionally substituted kink-forming arylene group, which is linked on each of its two ends to one halogen atom, such as chlorine, bromine, iodine, and fluorine. The elimination of the halogen atoms from the dihaloarylene molecular compounds results in the formation of respectively optionally substituted rigid rod-forming and optionally substituted kink-forming arylene groups.

Thus, for example:
the elimination of both chlorine atoms from a molecule of p-dichlorobenzene, p-dichlorobiphenyl or their homologous of general formula Cl-(φ)$_N$-Cl, N being an integer from 3 to 10, results in the formation of respectively 1, 2 or N adjacent p-phenylene units (rigid rod-forming arylene units); thus, p-dichlorobenzene, p-dichlorobiphenyl and their homologous of general formula Cl-(φ)$_N$-Cl, N as above defined, can be polymerized, so as to form p-phenylene units;
2,5-dichlorobenzophenone (p-dichlorobenzophenone) can be polymerized, so as to form 1,4-(benzoylphenylene) units (also rigid rod-forming arylene units);
m-dichlorobenzene can be polymerized, so as to form m-phenylene units (kink-forming arylene units).

In the present invention, one, two, three, or even more than three different kinked rigid-rod polyarylenes (P) can be used.

Optional Ingredients

The above described polymer material (M) may further contain one or more polymers other than the kinked rigid-rod polyarylene (P), and/or one or more non polymeric additives, collectively called optional ingredients.

The non polymeric additives of concern include notably fibrous reinforcing agents, particulate fillers and nucleating agents such as talc and silica, adhesion promoters, compatibilizers, curing agents, lubricants, metal particles, mold release agents, organic and/or inorganic pigments like TiO$_2$ and carbon black, dyes, flame retardants, smoke-suppressing agents, heat stabilizers, antioxidants, UV absorbers, tougheners such as rubbers, plasticizers, anti-static agents, melt viscosity depressants, and mixtures thereof.

In a first particular embodiment, the polymer material (M) further comprises at least one polyarylene other than the kinked rigid-rod polyarylene (P). The polyarylene other than the kinked rigid-rod polyarylene (P) is preferably a kinked rigid-rod polyarylene (P2) of which more than 50 wt. % of the recurring units are recurring units (R2) of one or more formulae consisting of an optionally substituted arylene group, provided said optionally substituted arylene group is linked by each of its two ends to two other optionally substituted arylene groups via a direct C—C linkage, said recurring units (R2) being a mix (M2) consisting of:
from 75 mole % to 100 mole %, based on the total number of moles of the recurring units (R2), of rigid rod-forming arylene units (R2a), said rigid rod-forming arylene units (R2a) being optionally substituted by at least one monovalent substituting group,
with
from 0 to 25 mole %, based on the total number of moles of the recurring units (R2), of kink-forming arylene units (R2b), said kink-forming arylene units (R2b) being optionally substituted by at least one monovalent substituting group.

Unless stated otherwise, the kinked-rigid rod polyarylene (P2) meets advantageously all the characteristics of the kinked-rigid rod polyarylene (P) as above detailed, at any level of preference.

The amount of the recurring units (R2a) and (R2b) of the kinked-rigid rod polyarylene (P2), the number of moles of the kink-forming arylene units (R2b) in the mix (M2), based on the total number of moles of the recurring units (R2), is preferably of at least 1.0%, more preferably at least 5% and still more preferably at least 10%. On the other hand, in the mix (M2), the number of moles of the kink-forming arylene units (R2b), based on the total number of moles of the recurring units (R2), is preferably of at most 20%, and more preferably of at most 18%. Good results are obtained when the polyarylene (P2) is a kinked rigid-rod polyphenylene copolymer, essentially all, if not all, the recurring units of which consist of a mix (M2) of p-phenylene substituted by a phenylketone group with unsubstituted m-phenylene in a mole ratio p-phenylene:m-phenylene of from 80:20 to 95:5, preferably of from 80:20 to 90:10, and still more preferably of about 85:15. Such a kinked rigid-rod polyphenylene copolymer is commercially available from Solvay Advanced Polymers, L.L.C. as PrimoSpire® PR-120 polyphenylene.

In this first particular embodiment, the weight of the polyarylene (P2), based on the total weight of the polymer material (M), may be of at least 1%, at least 5%, of at least 10%, or at least 15%; on the other hand, the weight of the polyarylene (P2), based on the total weight of the material, may be of at most 99%, of at most 95%, of at most 75%, or of at most 60%.

In another particular embodiment, the polymer material (M) further comprises at least one thermoplastic polymer other than a polyarylene, selected from the group consisting of polyamides (such as polyphthalamides), polyether block amides, polyimides, polyetherimides, polyamideimides, polyarylethersulfones (such as polyphenylsulfones, bisphenol A polysulfones, polyethersulfones, polyetherethersulfones, polyethersulfoneimides and copolymers and mixtures thereof), polyetherketones, polyetheretherketones, polyetherketoneketones, polyarylene ethers [such as polyphenylene ethers and poly(2,6-dimethyl-1,4-phenylene ether)s], polyphenylene sulfides, polybenzimidazoles, polycarbonates, polyesters, polyurethanes, polyolefins, poly(methyl pentene)s, polytetrafluoroethylenes, polyethylenes, polypropylenes, liquid crystalline polymers, halogenated polymers, and copolymers and mixtures thereof.

In still another particular embodiment, the polymer material (M) further contains at least one fibrous reinforcing agent, in particular an inorganic fibrous reinforcing agent such as glass fiber or carbon fiber, usually in an amount of from 10 to 50 wt. %, based on the total weight of the polymer material (M).

In a preferred embodiment, the polymer material (M) is essentially free of any fibrous reinforcing agent, notably inorganic fibrous reinforcing agents such as glass fiber or carbon fiber. More preferably, it is free of any fibrous reinforcing agent.

In another preferred embodiment, the polymer material (M) contains from 0 to 1% of metal, more preferably from 0 to 0.1%. Still more preferably, it is essentially free of any metal, and the most preferably, it is free of any metal.

The weight of the optional ingredients, based on the total weight of the material, ranges advantageously from 0 to 75 wt. %, preferably from 0 to 50 wt. %, more preferably from 0 to 25 wt. %, still more preferably from 0 to 10 wt. %, still more preferably from 0 to 5 wt. %, based on the total weight of the polymer material (M). Excellent results are obtained when the material is essentially free, or is even completely free, of said optional ingredients.

The fastener (F) can find utility as such or as a component of a multitude of devices, such as ball lock pins, latches, clips, clip nuts, plug and sleeve, floating nut fasteners, isolator mounts, nut plates, split joint fittings, floor fittings, quarter turn fasteners, inserts, support brackets, mounting brackets, latches, release pins, hinges, bolt bushings, cable ties, tubing hangers, wiring clamps, standoffs, spacers, conduit brackets, etc.

The fastener (F) is particularly useful for demanding applications. For example, it is particularly well suited for aircrafts and other self-propelled vehicles applications where lightness, torque, strength, toughness and resistance to thermal degradation are key properties.

Thus, another aspect of the present invention concerns an aircraft comprising at least one fastener (F) as above described.

The fastener (F) can be included notably in aircraft partitions, aircraft sidewalls, aircraft floorings, aircraft ceiling panels, aircraft passenger service units, aircraft infill panels, aircraft lighting sidewall and ceiling, aircraft video monitors, aircraft stow bins, aircraft oxygen boxes, aircraft HVAC ducting, aircraft food trays, aircraft arm rests, aircraft seat structures, aircraft sidewalls of lavatories, of galleys and catering trolleys, aircraft flight deck instrumentations, aircraft wire and cable harnessings and clampings, and aircraft power generation and distribution systems.

Related aspects of the present invention include:
  the use of an aircraft comprising at least one fastener (F) as above described for taking passengers and/or loading goods on board;
  the use of an aircraft comprising at least one fastener (F) as above described for transporting passengers and/or goods;
  the use of an aircraft comprising at least one fastener (F) as above described for disembarking passengers and/or unloading goods from said aircraft;
  a flying vehicle other than an aircraft, said flying vehicle comprising at least one fastener (F) as above described, in particular helicopters, hot-air balloons, gliders, and spatial rockets and shuttles;
  a self-propelled vehicle other than a flying vehicle, said self-propelled vehicle comprising at least one fastener (F) as above described, in particular a car, a motorbike, a trucks or a van;
  a self-propelled vehicle comprising at least one fastener (F) as above described;
  the use of a self-propelled vehicle comprising at least one fastener (F) for transporting passengers and/or goods.

More generally, the fastener (F) will be useful in any industrial application wherein chemical resistance, mechanical resistance, light weight, corrosion resistance and/or electrical insulation are important, such as the semicon industry. Thus, still another aspect of the present invention is directed to the use of the fastener (F) in semicon applications.

EXAMPLES

Set 1

Selected physical and mechanical properties of PrimoSpire® PR-250 polyphenylene (a highly kinked rigid-rod polyarylene of the last generation, commercially available from SOLVAY ADVANCED POLYMERS, L.L.C.), and both unreinforced and carbon fiber reinforced PEEK are shown in Table 1. Predicting fastener performance from data sheet properties is essentially impossible, as it will appear from the results below.

TABLE 1

Selected Mechanical and Physical Properties of Candidate Fastener Materials

| Property | Units | PrimoSpire ® PR-250 | PEEK | PEEK - 30% CF |
|---|---|---|---|---|
| Tensile Strength | psi | 22,000 | 14,000 | 30,800 |
|  | MPa | 152 | 96 | 212 |
| Tensile Modulus | kpsi | 800 | 520 | 2,900 |
|  | GPa | 5.5 | 3.6 | 20.0 |
| Elongation at Break | % | ~10 | ~20 | 2 |
| Flexural Strength | psi | 34,000 | 21,700 | 46,200 |
|  | MPa | 234 | 150 | 318 |
| Flexural Modulus | kpsi | 870 | 545 | 2,560 |
|  | GPa | 6.0 | 3.8 | 17.6 |
| Specific Gravity |  | 1.19 | 1.30 | 1.41 |

To demonstrate the utility of PrimoSpire® PR-250 polyphenylene as a material suitable for fasteners, in particular aerospace fasteners, a number of tests were run. Fastener tests included torque to failure and tensile strength. Both internal and external threads were evaluated.

Internal Threads

To evaluate internal threads, holes were drilled in plaques of the test material. The holes were then threaded using the appropriate tap. Steel machines screws were installed and the torque to failure was measured. In this test, failure occurred when the threads were stripped. The test results, shown in Table 2, indicate a clear superiority for PrimoSpire® PR-250 over 30% carbon-fiber reinforced PEEK. Also, the data for unreinforced PEEK shows that adding 30% carbon fiber did not improve the torque strength substantially.

TABLE 2

Torque to Failure
Steel Bolts in Tapped Holes in Test Material

| Fastener Size | Plaque Thickness | PrimoSpire PR-250 | PEEK | PEEK 30% CF |
|---|---|---|---|---|
| M2.5 | 0.125" (3.2 mm) | 8.4 in-lb (0.94 N · m) |  |  |
| M3 | 0.125" (3.2 mm) | 12.6 in-lb (1.4 N · m) |  | 9.0 in-lb (1.0 N · m) |
| 8-32 | 0.25" (6.3 mm) | 72 in-lb (8.1 N · m) |  |  |
| 10-32 | 0.25" (6.3 mm) | 81 in-lb (9.2 N · m) |  |  |
| ¼"-20 | 0.25" (6.3 mm) | 179 in-lb (20.2 N · m) | 55 in-lb (6.2 N · m) | 77 in-lb (8.7 N · m) |

Hence, still another aspect of the present invention concerns the use of at least one kinked rigid-rod polyarylene (P) of which more than 50 wt. % of the recurring units are recurring units (R) of one or more formulae consisting of an optionally substituted arylene group, provided said optionally substituted arylene group is linked by each of its two ends to two other optionally substituted arylene groups via a direct C—C linkage, said recurring units (R) being a mix (M) consisting of:

between 0 and 75 mole %, based on the total number of moles of the recurring units (R), of rigid rod-forming arylene units (Ra), said rigid rod-forming arylene units (Ra) being optionally substituted by at least one monovalent substituting group, with between 25 and 100 mole %, based on the total number of moles of the recurring units (R), of kink-forming arylene units (Rb), said kink-forming arylene units (Rb) being optionally substituted by at least one monovalent substituting group for increasing the torque of a polymer material (M) suitable for the manufacture of the fastener (F) as above described.

External Threads

To test external threads, machine screws were injection molded from the candidate resins. Holes were drilled in a steel plate that was 0.625" (16 mm) thick. The holes were threaded using the appropriate taps. The screws to be tested were installed and then torque was applied until the screws broke. The torque values are shown in Table 3. The torque required to break the PrimoSpire® PR-250 screws is about twice the torque needed to break the 30% CF PEEK screws.

TABLE 3

Torque to Failure of Injection Molded Screws

| Fastener Size | PrimoSpire ® PR-250 | PEEK 30% CF |
|---|---|---|
| 8-32 | 11.3 in-lb (1.3 N · m) | 7.0 in-lb (0.8 N · m) |
| 10-32 | 26.7 in-lb (3.0 N · m) | 12.6 in-lb (1.4 N · m) |

Tensile Strength Testing

Tensile strength data was obtained using the NASM 1312-8A test method and injection molded 10-32 machine screws. The results are shown in Table 4. The SRP showed higher tensile strength and a much lower standard deviation than the 30% carbon fiber reinforced PEEK.

TABLE 4

Tensile Strength of 10-32 Molded Screws by NASM 1312-8A

| | PrimoSpire ® PR-250 | PEEK 30% CF |
|---|---|---|
| Load at Fracture | 451 lb (204 kg) | 391 lb (177 kg) |
| Standard Deviation | 5.3 lb (2.4 kg) | 16.5 lb (7.5 kg) |

Other Important Considerations

The present experimental data were generated on machine screws, but the conclusions apply to many fastener types, such as bolts, nuts, washers, pins, and scrivets. Engineered fasteners like clip nuts, nut plates, mounts, inserts, latches, hinges, clamps, and spacers should also be considered as candidates for weight reduction and performance enhancement. As important as the weight reduction and high strength that a highly kinked rigid-rod polyarylene such as PrimoSpire® PR-250 can supply in an aircraft fastener, there is also the benefit created through the use of an inherently, electrically, non-conductive material. The electrical properties of the PrimoSpire® PR-250 and the 30% carbon fiber PEEK are shown in Table 5.

TABLE 5

Selected Electrical Properties

| Property | PR-250 | PEEK 30% CF | Units |
|---|---|---|---|
| Volume Resistivity, ASTM D257 | $>7 \times 10^{15}$ | $5 \times 10^7$ | ohm-cm |
| Surface Resistivity, ASTM D257 | $>5 \times 10^{15}$ | | ohm/sq |
| Dielectric Strength, ASTM D149 | 505 (20) | | V/mil (kV/mm) |

Eliminating the juncture of dissimilar metals prevents galvanic corrosion. Since corrosion can occur even with similar metals, the use of a non-conductive fastener provides additional protection from corrosion. This often results in lower maintenance costs and reduced downtime. The thermoplastic molded fastener will never corrode or participate in any galvanic corrosion of other components. Flammability, smoke generation, and toxicity data for the PrimoSpire® PR-250 material is shown in Table 6. As the data suggest, the material is inherently flame retardant (without additives), generates little smoke, and is non-toxic, all desirable characteristics for aircraft applications.

TABLE 6

Flame, Smoke, and Toxicity Values of PrimoSpire ® PR-250

| Property | Test Method | Value |
|---|---|---|
| OSU 2 min. Peak | FAR 25.853 | 10 kW/min · m² |
| OSU 5 min. Total | FAR 25.853 | 30 kW/min · m² |
| Vertical Burn | DMS 1510 | 2" (51 mm) |
| $D_m$ @ 4 min. | F814/E662 | 1 |
| Toxicity, ppm | BSS 7239/ ATS 1000/ ABD0031 | HCN < 1<br>CO < 1<br>NO + NO$_2$ < 1<br>SO$_2$ < 1<br>HF 10<br>HCl 5 |

Set 2

Figure 9:
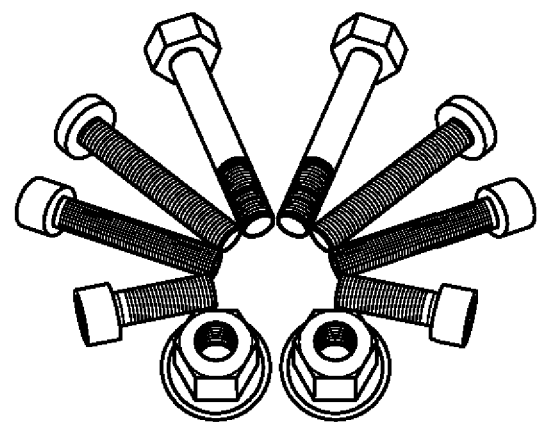
FIG. 9 represents an example of fasteners made of PrimoSpire® PR-250 polyphenylene in accordance with the present invention.

A photograph showing different fasteners made of PrimoSpire® PR-250 polyphenylene, a highly kinked rigid-rod polyarylene of the last generation, are shown in FIG. 9 for illustrative purposes.

Should the disclosure of any of the patents, patent applications, and publications that are incorporated herein by reference conflict with the present description to the extent that it might render a term unclear, the present description shall take precedence.

The invention claimed is:

1. A fastener (F) consisting of a polymer material (M) consisting of at least one kinked rigid-rod polyarylene (P) of which the recurring units are recurring units (R) of one or more formulae consisting of an optionally substituted arylene group, provided said optionally substituted arylene group is linked by each of its two ends to two other optionally substituted arylene groups via a direct C—C linkage, said recurring units (R) being a mix (M) consisting of:
  between 0 and 75 mole %, based on the total number of moles of the recurring units (R), of rigid rod-forming arylene units (Ra), said rigid rod-forming arylene units (Ra) being optionally substituted by at least one monovalent substituting group,
with
  between 25 and 100 mole %, based on the total number of moles of the recurring units (R), of kink-forming arylene units (Rb), said kink-forming arylene units (Rb) being optionally substituted by at least one monovalent substituting group.

2. The fastener according to claim 1, wherein, in the mix (M), the number of moles of the kink-forming arylene units (Rb), based on the total number of moles of the recurring units (R), is of at least 40%.

3. The fastener according to claim 1, wherein, in the mix (M), the number of moles of the kink-forming arylene units (Rb), based on the total number of moles of the recurring units (R), is of at most 65%.

4. The fastener according to claim 1, wherein the recurring units (R) of the kinked rigid-rod polyarylene (P) are a mix (M) consisting of:
  between 0 and 75 mole %, based on the total number of moles of recurring units (R), of rigid rod-forming arylene units (Ra) chosen from p-phenylenes optionally substituted by at least one monovalent substituting group,
with
  between 25 and 100 mole %, based on the total number of moles of recurring units (R), of kink-forming arylene units (Rb) chosen from (i) m-phenylenes optionally substituted by at least one monovalent substituting group and (ii) mixes of m-phenylenes with o-phenylenes, wherein both m-phenylenes and o-phenylenes are, independently from each other, optionally substituted by at least one monovalent substituting group.

5. The fastener according to claim 4, wherein the rigid rod-forming arylene units (Ra) of the mix (M) are p-phenylenes substituted by a phenylketone group and the kink-forming arylene units (Rb) of the mix (M) are unsubstituted m-phenylenes.

6. The fastener according to claim 1, being a threaded fastener.

7. The fastener according to claim 6, wherein all its threads are composed of the polymer material (M) and its threaded surface represents above 20% of its whole surface.

8. The fastener according to claim 6, being selected from the group consisting of bolts, nuts, screws, headless set screws, scrivets, threaded studs and threaded bushings.

9. The fastener according to claim 1, being an unthreaded fastener.

10. The fastener according to claim 9, being selected from the group consisting of pins, retaining rings, rivets, and fastening washers.

11. A self-propelled vehicle comprising at least one fastener (F) according to claim 1.

12. The self-propelled vehicle according to claim 11, being an aircraft.

13. The fastener according to claim 7, being selected from the group consisting of bolts, nuts, screws, headless set screws, scrivets, threaded studs, and threaded bushings.

14. The fastener according to claim 1, being selected from the group consisting clip nuts, nut plates, mounts, inserts, latches, hinges, clamps, and spacers.

* * * * *